US011009898B2

(12) United States Patent
Zuluaga et al.

(10) Patent No.: US 11,009,898 B2
(45) Date of Patent: May 18, 2021

(54) THERMAL ENERGY USAGE METERING SYSTEM FOR STEAM-HEATED MULTIPLE UNIT BUILDING

(71) Applicants: Marc Zuluaga, Montclair, NJ (US); Jason Block, Brooklyn, NY (US)

(72) Inventors: Marc Zuluaga, Montclair, NJ (US); Jason Block, Brooklyn, NY (US)

(*) Notice: Subject to any disclaimer, the term of this patent is extended or adjusted under 35 U.S.C. 154(b) by 53 days.

(21) Appl. No.: 15/852,278

(22) Filed: Dec. 22, 2017

(65) Prior Publication Data
US 2018/0181150 A1  Jun. 28, 2018

Related U.S. Application Data

(60) Provisional application No. 62/438,614, filed on Dec. 23, 2016.

(51) Int. Cl.
| | |
|---|---|
| *G05D 23/19* | (2006.01) |
| *G05D 23/30* | (2006.01) |
| *F24D 19/10* | (2006.01) |
| *F24D 1/02* | (2006.01) |
| *F24F 140/60* | (2018.01) |

(52) U.S. Cl.
CPC ......... *G05D 23/1931* (2013.01); *F24D 1/02* (2013.01); *F24D 19/1003* (2013.01); *F24D 19/1048* (2013.01); *G05D 23/1934* (2013.01); *G05D 23/30* (2013.01); *F24F 2140/60* (2018.01); *Y02B 30/00* (2013.01)

(58) Field of Classification Search
CPC ........... G05D 23/1931; G05D 23/1934; G05D 23/30; F24D 1/02; F24D 19/1003; F24D 19/1048; F24F 2140/60; Y02B 30/16; Y02B 30/00; Y02B 30/70
See application file for complete search history.

(56) References Cited

U.S. PATENT DOCUMENTS

| | | | | |
|---|---|---|---|---|
| 4,363,441 | A * | 12/1982 | Feinberg | G01K 17/12 165/11.1 |
| 4,484,620 | A * | 11/1984 | McHugh | G01K 17/06 165/11.1 |

(Continued)

FOREIGN PATENT DOCUMENTS

KR  101466901 B1 * 12/2014

OTHER PUBLICATIONS

Choi, et al., "Steam System Balancing and Tuning for Multifamily Residential Buildings in Chicagoland-Second Year of Data Collection", Aug. 2013.

*Primary Examiner* — Yuhui R Pan
(74) *Attorney, Agent, or Firm* — St Onge Steward Johnston and Reens LLC

(57) ABSTRACT

A system for determining the relative space heating energy contribution of different tenant spaces in a multiple tenant building that is heated via a central steam piping distribution system. A steam piping distribution system is connected to a central heat source such as a steam boiler plant or a local utility district steam service. The steam distribution system includes terminal units located throughout the building which deliver heat to different spaces. Data collected at regular intervals from sensors located throughout the building are analyzed by a computer in order to calculate the fraction of the overall building's steam use that is delivered to particular tenant spaces over a given interval in time.

32 Claims, 2 Drawing Sheets

(56) References Cited

U.S. PATENT DOCUMENTS

| | | | |
|---|---|---|---|
| 5,646,858 A * | 7/1997 | Schrock | G06Q 50/06 |
| | | | 705/412 |
| 6,454,179 B1 | 9/2002 | Neve et al. | |
| 6,622,929 B1 | 9/2003 | Levitin et al. | |
| 6,708,083 B2 | 3/2004 | Orthlieb et al. | |
| 7,272,452 B2 | 9/2007 | Coogan et al. | |
| 7,328,587 B2 | 2/2008 | Shaffer et al. | |
| 8,224,490 B2 | 7/2012 | Knyazev | |
| 8,756,024 B2 | 6/2014 | Hedley et al. | |
| 9,074,770 B2 | 7/2015 | Young et al. | |
| 9,477,239 B2 * | 10/2016 | Bergman | G05D 23/19 |
| 2005/0051637 A1 | 3/2005 | Hansen | |
| 2010/0045470 A1 | 2/2010 | Araiza et al. | |
| 2010/0280665 A1 * | 11/2010 | Fildes | F24H 9/2035 |
| | | | 700/275 |
| 2012/0029725 A1 | 2/2012 | Lafleur et al. | |
| 2012/0061069 A1 * | 3/2012 | Schwartz | F01P 7/042 |
| | | | 165/271 |
| 2013/0060719 A1 * | 3/2013 | Burke | G06Q 10/063 |
| | | | 705/412 |
| 2014/0238061 A1 * | 8/2014 | Shimamoto | F25B 13/00 |
| | | | 62/160 |
| 2014/0277764 A1 | 9/2014 | Burt | |
| 2015/0233597 A1 | 8/2015 | Dempster et al. | |
| 2015/0323200 A1 * | 11/2015 | Gluck | F24D 19/1003 |
| | | | 237/9 R |
| 2016/0084514 A1 * | 3/2016 | Salsbury | F24F 11/62 |
| | | | 700/276 |
| 2016/0356515 A1 * | 12/2016 | Carter | G05B 13/048 |
| 2017/0038279 A1 * | 2/2017 | Dasgupta | G01M 99/00 |

* cited by examiner

THERMAL ENERGY USAGE METERING SYSTEM FOR STEAM-HEATED MULTIPLE UNIT BUILDING

FIELD OF THE INVENTION

This invention relates to a system for assessing the space heating energy impact of each of a plurality of tenant spaces served by steam heating terminal units that are in turn supplied by a central heat source. Data analyzed from this system can be used to rationally allocate space heating operating costs to individual tenants.

For the purposes of this disclosure, tenants are defined as the people or groups of people occupying particular portions of buildings. Tenants may pay rent to a building owner or landlord. Tenants may also be part owners of a building for example, in the case of a condo or co-operative.

BACKGROUND OF THE INVENTION

A common arrangement for providing heating for each of the units of multi-tenant buildings such as apartment houses or office structures employs steam distribution piping to transfer heat from a central heat source to terminal units located throughout a building. There are three main types of steam distribution systems: one-pipe, two-pipe, and metro systems.

In one-pipe steam systems, each terminal unit has a single piping connection, which directs steam to flow into the terminal unit and allows condensate to flow away from the terminal unit. Each terminal unit also has a connection for a vent, which provides a path for the air to exit the terminal unit, thereby allowing the steam to enter. The individual one-pipe terminal units are connected in parallel to an arrangement of mains and risers which carry the steam from the central heat source to the terminal units.

In two-pipe steam systems, each terminal unit has two piping connections: one that directs steam flow into the terminal unit and another that allows air and condensate to flow away from the terminal unit. As with one-pipe systems, the individual two-pipe terminal units are connected in parallel to an arrangement of mains and risers which carry the steam from the central heat source to the terminal units and the air and condensate away.

In Metro steam systems, each terminal unit has two piping connections; however, they are arranged in series, such that the outlet of one terminal unit within a particular riser serves as the inlet to the next. The risers themselves are connected in parallel to an arrangement of mains, which carry the steam from the central plant to the terminal units and the air and condensate away.

In one-pipe steam systems, valves can be installed at each terminal unit air vent to modulate the venting of air from the terminal unit in response to local space temperature. The venting of air out of the terminal unit regulates the flow of steam into, and heat output from, the terminal unit. These valves may be thermo-mechanical or electronic, the latter of which can communicate data on valve position (i.e., percentage open), time stamps on when the valve position is in particular positions and local space temperature to a local thermostat or computer at regular intervals.

In two-pipe steam systems, valves can be installed at the steam inlet of the terminal unit to modulate the heat output of the terminal unit in response to local space temperature. These valves may be thermo-mechanical or electronic, the latter of which can communicate data on valve position (i.e., percentage open), time stamps on when the valve position is in particular positions and local space temperature to a local thermostat or computer at regular intervals.

In Metro steam systems, valves at the terminal units are not viable given the series arrangement. In these systems, the terminal units can be fitted with an enclosure containing a fan or damper that is cycled to modulate the heat output of the terminal unit in response to local space temperature. In these cases, data on fan operation and/or speed as well as the temperature of the air supplied to the space can be communicated to a local thermostat or computer at regular intervals.

There are also systems where the terminal units in one-pipe and two-pipe systems have existing or can be retrofitted with enclosures and fans or dampers as described above. In these applications, data similar to that described above can be communicated.

In all systems, regardless of terminal unit type, the following data can be communicated to a local thermostat or computer at regular intervals: room temperatures of different tenant spaces, the position of windows (i.e. open, closed, or percentage open) in different tenant spaces, and steam pipe temperatures at the inlet or outlet of terminal units.

An alternative method of providing heating for all of the terminal units in a multi-tenant building employs hot water as the heat transfer medium instead of steam. Such hot water distribution systems transfer heat from a central heat source to terminal units in a multi-tenant building through a circulating water loop. In these systems, metering the heat delivered to each tenant space is relatively straightforward, since the heating medium remains a liquid, flows in a single direction, and is dependent on easily-measured sensible heat. For example, U.S. Pat. No. 4,363,441 describes a metering approach for hot water systems that employs a flow regulator valve at each terminal unit that maintains a known and constant flow. In this approach, data on the known flow rate is combined with temperature data sampled at regular intervals from the terminal unit inlet and outlet in order to calculate terminal unit heat output. Also, U.S. Pub. No US2014/0277764A1 describes a metering approach for hydronic systems that uses a valve actuator to "determine the volume of fluid flowing though the valve." This invention is only appropriate for liquid flow measurement.

Such an approach will not work for steam heating systems for a few reasons. Steam piping contains a continually varying mixture of three fluids: steam, water (i.e., condensate), and air, unlike hot water systems, which contain only water. Steam releases latent heat (i.e., energy due to phase change) to the space, which is very difficult to directly measure in a cost effective and compact manner, unlike hot water, which gives off sensible heat (i.e., temperature change). Additionally, most steam heating systems turn the central heat source on and off over the course of the day, which creates periods when the local terminal unit control valve may be open but there is no steam in the piping, resulting in no heat being provided. This is in contrast to hot water systems, which tend to be continuously circulated whenever the system is in operation, and employ control valves located at each terminal unit that open and close in order to vary the heat output in response to local space temperature. As a consequence of this frequent cycling, steam heating systems are more prone to issues of imbalance and air binding, which can inhibit the even distribution of heat throughout a building. One of the most common causes of this is broken steam traps, which allows steam into the return piping, throwing off the system's pressure regime.

There are, however, a few similarities between steam and hot water systems with respect to sub metering the heating energy. In both cases there are advantages to implementing enhanced controls and tenant metering at the same time since the same types of system upgrades, sensors and data that can be used to improve system control can also be used to meter tenant spaces, reducing installation costs and tenant inconvenience. Additionally, in both cases, the submetering of heating energy consumed in each tenant space can spur behavioral change by giving tenants direct feedback of their heating energy consumption.

Steam heating systems are more commonly found in older buildings. Deficiencies in the building envelopes more common in older buildings can have an impact on heat cost allocation. The best thermally performing building envelopes found in modern buildings utilize insulation and air leakage control strategies to minimize both the absolute winter heat loss through the enclosure and also to minimize erratic differences in enclosure heat loss between different tenant spaces. In such buildings, heat loss through the envelope is relatively uniform so comparable tenant spaces maintained at the same temperature will lose comparable amounts of heat through the respective portions of the building envelope that enclose them. Steam heating systems tend to be found in older buildings with building envelopes that all else being equal, do not necessarily result in perfectly uniform heat loss between tenant spaces. For instance, during the winter, as a result of the stack or "chimney" effect, cold outdoor air tends to enter buildings through gaps and cracks in lower portions of the building envelope and is heated to room temperature by lower floor terminal units. The infiltration of outdoor air into lower portions of a building causes conditioned air to exit buildings through gaps and cracks in the building envelope at upper floors. In this scenario, air that exfiltrates out of a building's upper floors typically is replaced with already conditioned "make-up air" drawn from lower floors. Entering cold air increases the heat loss of a tenant space. Existing conditioned air does not directly increase the heat loss of a tenant space if the make-up air is already conditioned. Therefore, as a result of envelope construction quality outside of a tenant's control, a lower floor tenant space may require significantly more heating energy then an upper floor tenant space.

SUMMARY OF THE INVENTION

A well-controlled heating system will provide the precise amount of heat to a heating terminal unit that is being lost by the room served by that terminal space. A well-controlled and sub-metered heating system will allocate costs to the tenant in direct proportion to the heat supplied to the space. If a significant portion of a particular tenants allocated heat costs are due to envelope construction deficiencies outside of that tenant's control, then the heat allocation method has the potential to be viewed by that tenant as unequitable.

In addition to heat transfer to tenant spaces through controllable terminal units, it is possible for a significant degree of heat to be transferred to tenant spaces via steam piping located behind walls and under floors. This source of heat gain is particularly relevant to tenant spaces in older steam heated buildings since steam pipe surface temperatures are higher than hot water pipe surface temperatures and older buildings often have less pipe insulation than newer buildings Therefore, it is an object of the invention to provide a system for monitoring heat use at particular tenant spaces so that each tenant can be charged in relation to their usage of heating.

A further object of the invention is to provide for control of individual tenant spaces to allow for different settings of requested temperatures which would likewise impact a charge to the tenant.

A further object of the invention is to provide for the identification of localized issues that may affect a tenant's desired heating usage of a particular space. For example, data coming from the system can be used to detect and rectify operational or envelope defects that may be out of a tenant's control, such as an imbalance or delay in the delivery of steam to specific terminal units or unusually leaky windows, air conditioner installations or other envelope deficiencies. A tenant space that does not increase in temperature at as fast of a rate as comparable tenant spaces when heat is being supplied may be an indicator of a localized heat supply imbalance. Similarly, a tenant space that decreases in temperature at a significantly faster rate than other comparable tenant spaces after the heat supply is cut off to the whole building may be an indicator of a localized envelope deficiency. The continual analysis of data to identify potential localized problems can inform building operations and maintenance practices to support equitable heat allocation.

Moreover, the same types of data that can be used to allocate heat costs can also be used to identify localized problems in heat supply or heat loss. The resulting data driven approach to identifying and addressing localized issues is supportive of equitable sub-metering by allowing differences in heat allocation costs between tenant spaces to be primarily driven by tenant behavior.

These and other objects are achieved by providing a computer which communicates with a steam heat source and a plurality of devices each associated with a tenant space. The devices can include fans, thermostats, room temperature sensors, valves and combinations thereof. A data storage includes information relative to the tenant spaces such as heating element (e.g., radiator) information which may include thermal transfer properties thereof and space information which may include heat loss properties thereof based on thermodynamic principles and assumptions that can be made based on the makeup of a particular space. For example, additional windows would be expected to lead to faster heat loss than a space with fewer windows.

In one aspect a steam heating metering and control system is provided and includes a computer in communication via a network with a steam heating source. Valves and temperature sensors are also provided. Each temperature sensor is associated with at least one of the control valves. The steam heating source is coupled to heat elements via piping such that adjustment of the valve position of one of the valves changes an amount of steam entering an associated heat element when the steam heating source is activated. Software executes on the computer and receives data from the valves indicative of a valve position thereof and status data from the steam heating source indicative of whether or not the steam heating source is activated. A data storage is accessible by the software and has heat element information indicative of specifications of the plurality of heat elements stored thereon. When the steam heating source is activated, the software determines a tenant heat use quantity based on one or more of: at least one of valves based on the valve position thereof, the specifications of the associated heat element, and readings from one of the plurality of temperature sensors associated with the valve.

In another aspect a steam heating metering and control system is provided and includes a computer in communication via a network with a steam heating source. Fans and/or dampers and temperature sensors communicate with the computer, and each temperature sensor is associated with at least one of the fans or dampers. The steam heating source is coupled to heat elements via piping such that adjustment of the damper or speed of the fan is proportional to an amount of heat delivered when the steam heating source is activated. Software executes on the computer and receives data from the fans indicative of the speed thereof and/or dampers indicative of the position thereof, and status data from the steam heating source indicative of whether or not the steam heating source is activated. A data storage is accessible by the software and has heat element information indicative of specifications of the plurality of heat elements stored thereon. When the steam heating source is activated, the software determines a tenant heat use quantity based on one or more of: at least one of the fans based on the speed thereof, dampers based on the position thereof, the specifications of the associated heat element, and readings from the temperature sensors associated with the fan and/or damper.

In yet another aspect a steam heating metering and control system is provided including a computer in communication via a network with a steam heating source. The steam heating source is coupled to heat elements via piping. Software executes on the computer and receives status data from the steam heating source indicative of whether or not the steam heating source is activated. A data storage is accessible by the software and has heat element information indicative of specifications of the plurality of heat elements stored thereon and space information indicative of a thermal model of heat loss out of the space. When the steam heating source is activated, the software determines a tenant heat use quantity based on the heat element information, the space information and a time associated with the heating source status data indicative of the steam heating source being activated.

In other aspects a steam heating metering and control system is provided including a computer in communication with a steam heating source, valves and temperature sensors. Each temperature sensor is associated with at least one of the valves. The steam heating source is coupled to heat elements via piping such that adjustment of the valve position of one of the plurality of valves changes an amount of steam entering an associated one of the plurality of heat elements when the steam heating source is activated. Software executes on the computer and receives data from the valves indicative of a valve position thereof and status data from the steam heating source indicative of whether or not the steam heating source is activated. A data storage is accessible by the software and has heat element information indicative of specifications of the plurality of heat elements stored thereon. When the steam heating source is activated, the software determines a tenant heat use quantity based on one or more of: at least one of the plurality of valves based on the valve position thereof, the specifications of the associated heat element, and readings from one of the plurality of temperature sensors associated with the valve.

In certain aspects the temperature sensor is part of a thermostat. In other aspects the temperature sensors supply data indicative of a steam temperature entering the heat element. In other aspects the temperature sensors include an inlet and/or outlet temperature sensor. The inlet temperature sensor measures an incoming temperature of steam to the heat element, the outlet temperature sensor measures an outgoing temperature of steam or steam condensate exiting the heat element. In certain aspects, the heat use quantity is determined based on a comparison between incoming and outgoing temperatures and a quantity of steam introduced to the heat element. In other aspects the quantity of steam is measured by a flow sensor. In other aspects, the valve position is manipulated by a motor which is controlled remotely therefrom. In still other aspects, the valve position is controlled by the computer based on readings from the temperature sensor, the temperature sensor being part of a thermostat. In yet other aspects the heat elements are each located in separate tenant spaces and based upon the heat use quantity determined by the system as compared to a heat use quantity of the steam heating source a charge is determined for each of the separate tenant spaces.

In other aspects a steam heating metering and control system is provided including a computer in communication with a steam heating source, a plurality of heat delivery devices and a plurality of temperature sensors, each temperature sensor associated with at least one of the plurality of fans. The steam heating source is coupled to heat elements via piping such that adjustment the heat delivery devices is proportional to an amount of heat delivered when the steam heating source is activated. Software executes on the computer and receives data from the fans indicative of the speed thereof and status data from the steam heating source indicative of whether or not the steam heating source is activated. The data storage accessible by the software and has heat element information indicative of specifications of the plurality of heat elements stored thereon. When the steam heating source is activated, the software determines a tenant heat use quantity based on one or more of: at least one of the plurality of fans based on the speed thereof, the specifications of the associated heat element, and readings from one of the plurality of temperature sensors associated with the fan.

In certain aspects, the heat delivery device includes a fan. In other aspects, the heat delivery includes a damper. In other aspects the heat delivery device further includes a fan and damper. In other aspects, the heat elements are each located in separate tenant spaces and based upon the heat use quantity determined by the system as compared to a heat use quantity of the steam heating source a charge is determined for each of the separate tenant spaces.

In other aspects a steam heating metering and control system is provided including a computer in communication with a steam heating source and temperature sensors. The steam heating source is coupled to heat elements via piping and at least two sets of the plurality of heat elements comprise one or more heat elements and the at least two sets are located in at least two separate tenant spaces. Software executes on the computer and receives status data from the steam heating source indicative of whether or not the steam heating source is activated. A data storage is accessible by the software and has heat element information indicative of specifications of the plurality of heat elements stored thereon and space information indicative of a thermal model of heat loss out of the space. When the steam heating source is activated, the software determines a tenant heat use quantity for each of the at least two tenant spaces based on the heat element information, the space information and a time associated with the heating source status data indicative of the steam heating source being activated. The software further determines a charge for the heat use quantity for each of the at least two tenant spaces based on a charge for energy usage associated with the steam heating source.

In some aspects the temperature sensor is part of a thermostat. In other aspects the temperature sensor supplies data indicative of a steam temperature entering the heat element. In other aspects the of temperature sensors include an inlet and outlet temperature sensor the inlet temperature sensor measuring an incoming temperature of steam to the heat element, the outlet temperature sensor measuring an outgoing temperature of steam or steam condensate exiting the heat element. In other aspects the heat use quantity is determined based on readings from a flow sensor associated with one of each of the at least two tenant spaces. In certain aspects, the system includes a valve associated with each of the heat elements. A position of the valve is manipulated by a motor based on signals from the computer. The signals are determined based at least in part on a thermostat setting and a measured temperature from the thermostat.

Other objects and the particular features and advantages thereof will be apparent in the below description and attached drawings.

DETAILED DESCRIPTION OF THE INVENTION

Figure 1:
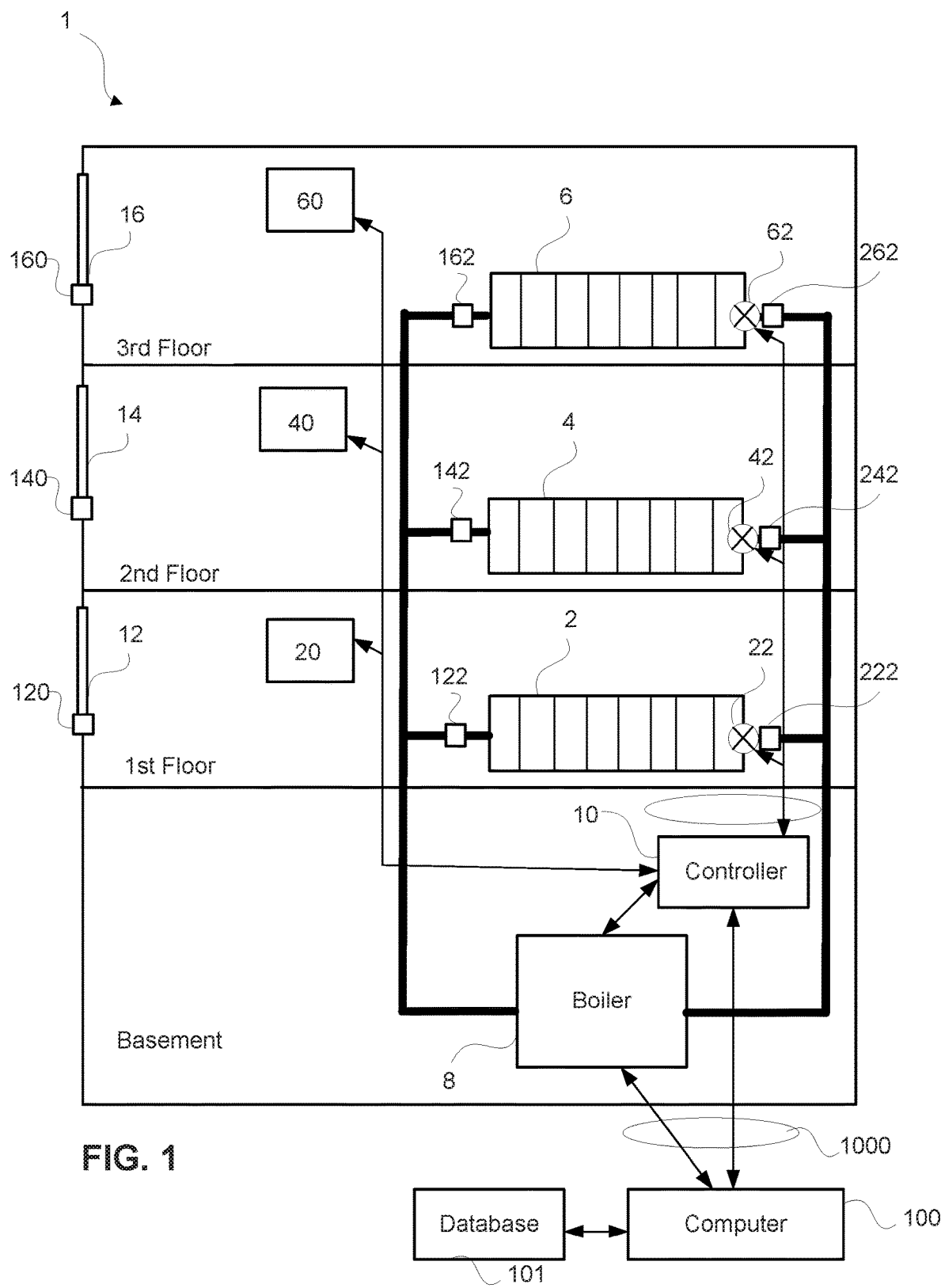
FIG. 1 is a functional flow diagram according to the present invention.

The following examples are presented to further illustrate and explain the present invention and should not be taken as limiting in any regard. The present disclosure is therefore directed toward a system for measuring and recording the relative energy consumption of each of a plurality of steam terminal units all connected to central heat source, as well as a means of allocating such consumption to the individual tenant spaces in a way that encourages rational behavior.

This system utilizes readily available sources of data from sensors located throughout a building. This system design is also flexible in recognition of the fact that not all types of sensors and data are relevant to all buildings and that, depending on the application, there are advantages and disadvantages to incorporating a smaller or greater number of sensor types to achieve tenant level metering. Data from the following types of sensors can be used to calculate the relative amount of heat distributed from the central heat source to each tenant space: indoor temperature, terminal unit temperature, terminal unit valve position, fan coil fan operation, fan coil supply air temperature, window status (i.e., open, closed, or percentage open), central plant operating status, and central plant operating costs. Different applications can utilize different combinations of the above-described sensors to determine and rationalize each tenant space's contribution to the whole building heating load. It is advantageous in applications for a system that enables this tenant-level metering to also provide actionable feedback on operations and tenant behavior. As such, data from these sensors can also be analyzed to diagnose problems with the operation of the steam distribution system, to define normal ranges for the rate that particular spaces lose heat, and to identify locations in a building where either localized building envelope deficiencies, system deficiencies, or tenant behavior may be contributing to excessive heat loss. It is understood that other sensors may be employed and that the foregoing are exemplary only.

The disclosed strategies all achieve the goal of continually assessing the relative heating energy use of different spaces in a building that are heated by a steam heating distribution system connected to a central heat source. Metering data of the energy consumption at the central heat source is readily available in buildings over various time intervals ranging from monthly utility bills to more granular outputs from fuel or district steam meters. Energy commodity costs of the fuel or district steam utilized by the central heat source as well as associated maintenance costs over a given time interval are also readily available. In many cases, a central heat source with a single central meter provides heating energy for both building space heating and building service water heating. A variety of methodologies are well understood by those versed in the state of the art to disaggregate the consumption of space heating energy use from other major end uses of fuel in order to determine the total energy use of a building for space heating. By combining the total energy use for space heating with the relative energy consumption of different tenant spaces, the disclosed invention allows for the tenant level sub metering of energy for space heating.

The disclosed invention allows for several approaches to assess the relative energy consumption of different tenant spaces served by steam heated terminal units. In all approaches described below, the preferred embodiment of this invention is to implement system-wide upgrades to improve the balance of heat distribution to all tenant spaces and to identify any significant and correctable localized envelope or distribution deficiencies prior to billing tenants for space heating energy use. In all approaches, the preferred embodiment of this invention is to utilize data continually collected for the purpose of sub-metering to also continually assess heat balance and envelope performance in order to inform building operations and support equitable sub-metering. In all approaches, the disclosed approach to determining the relative heating energy contribution of tenant spaces can be augmented with correction factors to improve its ability to impact tenant behavior. For example, each tenant's bill may be comprised of more than one component; there may be a fixed component that is indexed to the square footage of the space as well as a variable component that accounts for that space's contribution to the total building heating usage.

For instance, a top floor tenant space with exterior wall exposure as well as roof exposure will require more space heating energy to maintain a given space temperature than a lower floor tenant space with an identical floor plan and only exterior wall exposure. Similarly, a south-facing tenant space with significant solar heat gain will require less heating energy to maintain a given space temperature than a north-facing tenant space. In both cases, the space's location within the building is outside of a tenant's immediate control. However, in order to implement a billing system with a goal of encouraging rational tenant behavior, correction factors could be applied to ensure that the relative heating energy usage assigned to the two similarly-sized tenant spaces is comparable when set-points for the two spaces are equal and adjusted appropriately when set-points are different. Such correction factors can be established based on space characteristics and/or engineering principles for heat transfer that will be understood to those versed in the state of the art. Alternatively, such correction factors can be established based on systematic differences in data collected across tenant spaces. It is also possible that such correction factors will be informed by similar tenant spaces located in other buildings. For example, a tenant space located on the top floor and at the end of the hallway of a 6-story walkup may have more exposure than any other space within the same building; however, a neighboring building of the same size and layout may provide the closest comparison.

In addition to allowing for a means of billing of tenants to encourage rational behavior, the preferred embodiment of this invention combines ongoing tenant billing with ongoing analysis to provide tenants with actionable information to help them manage their energy costs. For instance, in the single family home sector, providing home owners with an understanding of the energy use of their homes with respect to comparable homes has been demonstrated to motivate behavior change and conservation. In a preferred embodiment of the disclosed invention, temperature and other data continuously collected from a large number of tenant spaces within a building or across buildings are analyzed to determine appropriate groups of comparable tenant spaces for comparative analysis. With equitable sub-metering, differences in the space heating energy use of a particular group of comparable tenant spaces should primarily result from differences in tenant behavior. The collected and analyzed data can be used to identify localized building envelope deficiencies or deficiencies in the steam distribution that inhibit certain spaces from receiving heat when the central heat source is operating. These can be used to provide actionable information to tenants and building operators in order to reduce heating energy use. Similarly, the data can also be indicative of tenant behavior (e.g., opening windows) that significantly increases heating energy use, which can inform targeted tenant education incorporating customized, quantitative feedback. For instance, monthly billing information for a specific tenant may be accompanied by summary information of average space temperature set—point, fraction of open windows and heat allocation costs specific to that tenant—and all of these parameters may be compared to aggregate results from comparable tenant spaces to provide each tenant with tangible feedback on how their behavior impacts their bill in order to encourage conservation.

The first approach to assessing the relative contribution of different tenant spaces in a steam-heated building requires data on control valve position at each terminal unit and space temperature at each tenant space. In two-pipe steam systems, control valves are located at the inlet of terminal units and regulate the flow of steam into the terminal unit. In one-pipe steam systems, control valves are located at the air vents of terminal units and regulate the flow of air out of the terminal unit which has a corresponding effect on the flow of steam into the terminal unit. These valves can be configured to report their position electronically at regular, frequent intervals. Valve position can be measured as a percentage relative to fully open (e.g., 0%, 10%, 25%, 30%, etc.) or as a linear measurement of valve displacement. Changes in valve position can be correlated with changes in steam flow into terminal units. For example, in a building with three terminal units, if each of the valves are 50% open, the metering system will compute that 33% of the space heating energy use over that time interval should be allocated to each terminal unit. Alternatively if two of the valves were 30% open and one of the valves was 0% open over a time interval, the system would compute that 50% of the space heating energy use over that time interval should be allocated to the terminal units with the two open valves. It should be understood to those trained in the state of the art on how data collected on valve position at terminal units connected to a pressurized steam main could be compiled to compute the relative heating energy use of different terminal units over a particular time interval.

However, it is important to note that unlike in hydronic systems, with steam systems, the central heat source may not be pressurizing the steam piping distribution system at all times that control valves call for heat. When the main steam piping is not pressurized, an open control valve at a terminal unit does not indicate that steam is flowing into the terminal unit. Similarly, steam systems are subject to operational problems that can cause delays in the delivery time of steam to certain terminal units. If, as a result of operational problems, piping at the inlet of a certain terminal unit is heating up at a much slower rate than corresponding piping at other terminal units, then control valve position data alone at this terminal unit is not reflective of that particular terminal units heating energy use. As such, the disclosed invention includes a means of combining valve position data with data collected from pipes surrounding terminal units in order to validate instances when valve position is indicative of steam flow into terminal units. In some cases, data from room air temperature of the particular space being heated by a terminal unit may also be used to validate that an open terminal unit control valve corresponds with steam flow into the terminal unit; however, room air temperature can be influenced by factors other than terminal unit heat output (e.g., open windows, cooking, etc.). In the preferred embodiment of this invention, room air temperature is utilized as a complimentary but secondary data source to pipe temperature in order to validate steam flow into terminal units. This methodology is applicable to all exemplary approaches described herein.

As an example, a 1,000 square foot tenant space with an 80 F set-point does not impact the space heating energy use of a building differently than a 1,000 square foot tenant space with a 70° F. set-point during time intervals when the steam piping is not pressurized. Similarly, steam systems are subject to operational problems that can cause delays in the delivery time of steam to certain terminal units. If, as a result of steam heating distribution system operational problems, tenant space temperature is significantly lower than the set-point of that tenant space, then set-point temperature data alone is not reflective of the relative energy use of that space. The disclosed invention incorporates a methodology to adjust the allocation of space heating energy use to a particular tenant space during time intervals when tenant space temperature is significantly below the lower deadband end of the space temperature set-point and windows are closed in that tenant space.

To account for factors outside of a tenant's control, such as solar gain, abnormally high localized indirect heating from steam piping located in walls or under floors, or neighboring tenant spaces maintained at significantly higher or lower temperatures in a way that does not penalize or advantage the tenant, the preferred embodiment of this invention will take into consideration periods of time when a certain tenant space temperature is increasing above the desired set-point and the terminal units are not operational. For example, a south-facing tenant space with a desired set-point of 72° F. and located in between two other spaces with set-points of 75° F. may see its space temperature increase even during periods when its terminal units are not operational (i.e., not "calling for heat") due to unintentional gains through its perimeter. In order to encourage rational tenant behavior, and not to double count these space temperature gains, such periods can be discounted when allocating heating energy usage.

The second approach is applicable to buildings with terminal units that incorporate electrically-powered fans or dampers to transfer heat to the tenant space. These fans may be part of the original terminal unit design or retrofitted to a terminal unit. Basic engineering performance information on the airflow rate of these fans is readily available and/or can be measured in the field. Where such fans are equipped with multi- or variable-speed controls, the disclosed invention incorporates fan motor current outputs or fan cabinet pressure as a proxy for time-varying fan airflow. The energy delivered to the tenant space is directly proportional to the fan airflow rate and the difference in temperature between supply air and return air. This approach requires data on fan supply air temperature and return air temperature. In these applications, the disclosed invention incorporates a temperature sensor or sensors in the fan supply air stream in an appropriate location to measure average supply air temperature. The disclosed invention also incorporates data from a temperature sensor or sensors near the inlet of the fan or from the air temperature of the space being served by the fan to measure return air temperature.

The third approach is applicable to buildings with terminal units that do not include fans. The heat output of the terminal unit is related to the difference between the temperature of the heat transfer surface of the terminal unit (e.g., convector fins, etc.) and that of the return air and/or room. Data on the heat transfer rate of various terminal units is readily available. It should be understood to those trained in the state of the art that a variety of engineering-based assumptions can be made to develop simple conversion factors for the output of terminal units for which published data is not available. This approach may rely on measured local space temperatures, or may make use of a fixed (i.e., static) indoor temperature. For example, a space with a desired temperature of 72° F. will reach its set-point earlier than one with a desired temperature of 75° F. Even if a fixed indoor temperature is used uniformly in the calculation across all tenant spaces, the terminal unit will need to operate less in the 72° F. space, and the data analysis can allocate heating energy use accordingly.

The fourth approach relies primarily on space temperature data and space temperature set-points of each tenant spaces along with data on window status (i.e., open, closed, or percentage open) for the windows in each tenant space along with static data on basic physical characteristics of each tenant space. Space temperature set-point in a particular tenant space is defined as the tenant-desired space temperature, which controls the terminal unit(s) operation. The actual temperature in a particular space can vary from the desired temperature set-point, and the varying difference between the two can be used to inform the relative heating energy use of the space. Window status is also incorporated into assessing the relative heating energy consumption of different tenant spaces. This approach utilizes measurement of the variables that most significantly impact heating energy consumption and are under direct tenant control, providing a means for allocating relative heating energy consumption as well as providing feedback to tenants to encourage rational behavior in applications where the first and second approaches are not feasible.

For instance, a 1,000 square foot tenant space maintained at 75° F. over a particular time interval can be allocated with a correspondingly greater portion of space heating energy use as a similar tenant space maintained at 72° F. Additionally, a 1,000 square foot tenant space maintained at 75° F. and three open windows can be allocated with a correspondingly greater portion of space heating energy use as a similarly-sized tenant space maintained at 75° F. and zero open windows. It should be understood to those trained in the state of the art that a variety of engineering-based assumptions can be made to develop simple correction factors for the impact of open windows on space heating energy use.

The fifth approach is similar to the fourth approach but, instead of window sensors, incorporates an analysis of the relative changes in space temperature of tenant spaces as a proxy to assess if windows are open in a particular tenant space. For instance, window status can be determined from data that shows space temperature of a particular tenant spaces decreasing at a much greater rate than other comparable tenant spaces or than its historical heat loss data would suggest. By analyzing historical heat loss trends observed at different indoor set-points (e.g., night-time setback) and outdoor temperatures, it can be determined whether a particular rate of heat loss is highly likely to be associated with open windows versus more characteristic patterns.

The sixth approach is similar to the first approach but relies primarily on space temperature data and not space temperature set-points. This approach is most applicable to buildings without localized digital thermostats that can control terminal unit operation and that can communicate set-point to a computer. This approach is most applicable to buildings with temperature sensors in the tenant spaces that are independent of control valves or electrically-powered fans or dampers. Such control valves or electrically-powered fans may be thermo-mechanical or otherwise self-contained. Tenants may have the ability to control terminal unit output by adjusting these valves and fans typically via a non-digital interface. The resulting impact of their behavior on terminal unit control changes and window opening is sensed by the space temperature sensor that communicates with the computer. Local building or local weather station solar insolation data as well as corresponding temperature changes to comparable spaces with similar exposures is used to ensure that a greater fraction of heat costs are not allocated to certain tenant spaces just because they experience greater solar gains. Thus, in one example, if the space information is known in terms of a thermal model and the temperature sensor reads a constant 70 degrees F., the rate of heat loss can be determined such that the amount of heat being fed into the space's heat elements or radiators can be determined since it is known that the temperature is constant. It is understood that external environmental factors such as temperature, sun energy and others may be used in determining how much energy is being input into the space based on a constant 70 degree temperature. Furthermore, when the temperature fluctuates or varies, it would be known based on the space information and expected heat loss how much energy was used to increase the temperature or cause the fluctuations/variations. Thus the temperature sensor may be a room temperature sensor which records variations/fluctuations in the temperature of the room. Furthermore, the system can be synchronized such that activation of the steam heating source is tied to increases in temperature such that an increase in temperature due to events un-related to the boiler being activated are not charged for based on the steam usage model.

Referring now to the drawings, FIG. 1 shows an exemplary three story building with three tenant spaces using a two pipe steam system. It is understood that a single pipe system could also be implemented without departing from the spirit of the invention. It is understood further that the use of three spaces is merely exemplary and that fewer or many more tenant spaces can be included in a building such as a large apartment complex, high-rise or other building. It is further understood that the system is not limited to residential settings, thus tenants could be companies or groups of companies or other artificial entities who occupy portions of a particular building.

As shown in FIG. 1, each space is divided by a floor. Each space is shown including a heat element 2, 4, 6 such as a radiator or other heat exchanger. The spaces further include a thermostat 20, 40, 60, a window with 12, 14, 16 a position sensor 120, 140, 160. Valves 22, 42 and 62 control the amount/rate of steam entering the radiator from the boiler 8 via the piping (thick black lines). The valves and thermostats are in communication with a controller 10 which is also in communication with the boiler 8. The controller receives position and temperature signals from the valve and thermostat respectively. In addition, the valve 22 may include a temperature sensor therein which measures incoming temperature into the corresponding radiator such that the presence of heat in the system can be determined. Alternately, separate sensor packs 222, 242, 262, 122, 142, and 162 may contain additional sensors used herein. For example, temperature sensors may be installed in packs 222, 242, 262 to measure incoming temperature. It is understood that the controller may also be considered a computer and that it may be in communication with the valves and sensors via wired, wireless or other types of networked and electrical connections. The controller may also have a data storage such as a database to receive/store data relevant to the control system as described herein.

Once each room has a calculated energy usage, a comparison to the overall energy used by the boiler can be used to divide up charges in a proportional and equitable manner. Other adjustments can be made based on environmental factors and lower than expected usages or anomalies that indicate that the heat delivery may not be working as anticipated or that heat loss is higher than anticipated. For example, if the valve is fully open and the temperature does not increase when the boiler is on, this would indicate a problem with heat delivery such that even though the valve is open and the boiler is activated, the tenant should not be charged when the actual heating response is not effective or the heat is not being delivered. Alerts indicative of problems or anticipated problems can be generated by the system to inform maintenance personnel. Furthermore, if abnormal heat losses are experienced, charges may be adjusted upwards and alerts may be issued such that maintenance can try to locate and then fix the cause of the heat loss.

For ease of depiction in FIG. 1, the connection between sensors 222, 242, 262 122, 142, and 162 have not been shown, but it is understood that wireless or wired communication may be employed and that wireless and wired communication technologies may also be employed as to the valves 22, 42, and 62.

The thermostats can also be configured to communicate with the central controller 10 via wireless or wired communications. These thermostats 20, 40, 60 and the rest of the valves/sensors can further communicate with a networked computer or central computer 100 which can both capture and control energy usage for each of the tenant spaces via a network connection 1000. A database 101 stores relevant energy usage, pricing, specification and other data for the operation of the system. The database may also store historical information related to temperatures, weather, thermostat settings, energy usage, energy costs etc. All of the foregoing may be used to determine patterns of energy usage for purposes of regulation and control of the system. The controller can activate the boiler 8 when necessary to maintain temperature in given spaces and can also modify valve 22, 42, and 62 positions to alter the amount of steam which enters a given tenant space based on the thermostat settings and measured temperatures. The valves 22, 42, and 62, may also be controlled by the thermostats 20, 40, and 60 co-located within the space.

In certain cases, a tenant may open a window 12, 14, 16 and the windows are outfitted with position sensors 120, 140, 160 to determine if/when and how far the window(s) is/are open. The controller 10 and/or the computer 100 may use an outside temperature sensor or third party weather information or weather station information to determine what effect opening of a window may have on the rate of heat loss in a tenant space and react accordingly.

Figure 2:
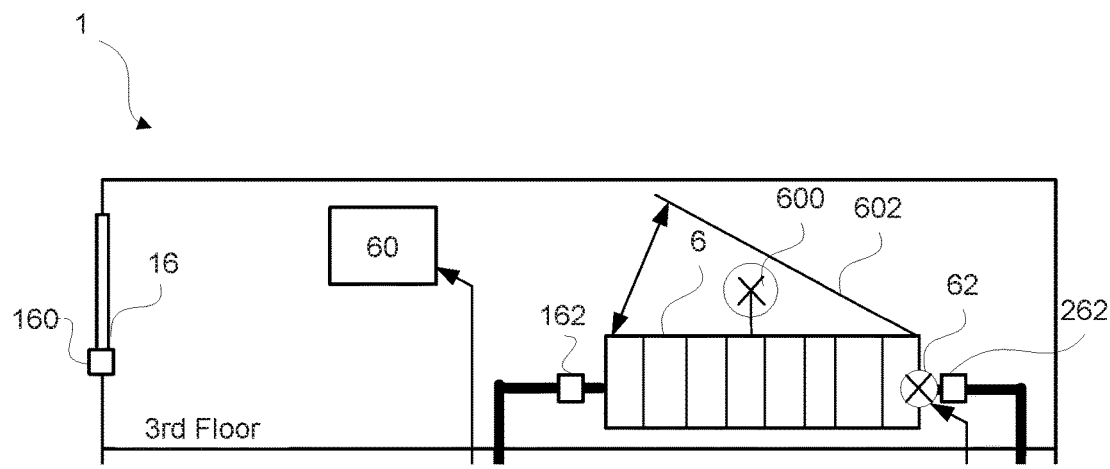
FIG. 2 is a functional flow diagram showing additional features which may be incorporated into the system of FIG. 1.

Referring to FIG. 2, a damper 602 is shown as is a fan 600. In this embodiment a fan assisted heat exchanger device is used. The fan and/or damper may be operated and controlled by the controller/computer or directly by the local thermostat.

Figure 3:
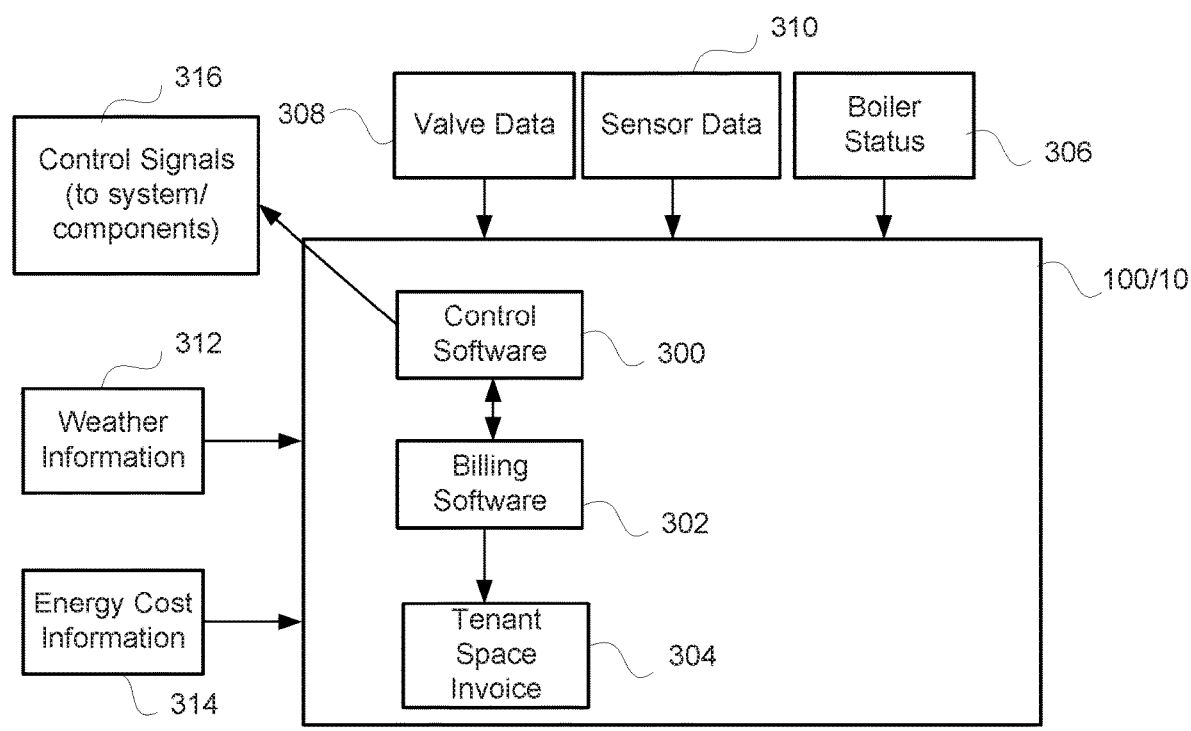
FIG. 3 shows elements of the control and invoicing software used in connection with the system of FIGS. 1 and 2.

FIG. 3 shows exemplary inputs for the computer/controller 100/10 which may be used to determine control signals 314 and may be used to generate tenant specific invoices 304. Valve position information, other sensor data 310 such as temperature, boiler status 306, weather information 312 and energy cost information 314 may all be used in determining both control signals 316 and tenant invoices 304. The control signals may modify the behavior of various devices such as the fans, dampers, valves, the boiler, as well as query various sensors to receive information back at the computer/controller. It is understood that the system may be configured such that it is monitored and controlled via a remote/networked central computer 100 or by a building controller 10 or that the various systems and operations may be accomplished by a combination of the two working together.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A steam heating metering system comprising:
   a computer in communication with a steam heating source, a plurality of valves and a plurality of temperature sensors, each temperature sensor associated with at least one of the plurality of valves and positioned remote from its associated valve and piping such that the plurality of temperature sensors measure temperature of one of one or more tenant spaces in a building;
   wherein the steam heating source is coupled to a plurality of heat elements via the piping such that adjustment of the valve position of one of the plurality of valves changes an amount of steam entering an associated one of the plurality of heat elements when the steam heating source is activated;
   software executing on said computer and receiving data from the valves indicative of a valve position thereof and status data from the steam heating source indicative of whether or not the steam heating source is activated;
   said software determines a tenant heat use quantity for each of the tenant spaces based on the status data from the steam heating source indicating the steam heating source is activated, readings from one of the plurality of temperature sensors associated with the valve, a set point of at least one thermostat in the tenant space, and a size of the tenant space.

2. The system of claim 1 wherein one of the plurality of temperature sensors is part of a thermostat.

3. The system of claim 1 further comprising a second set of a plurality of temperature sensors, at least one of which supplies data indicative of a steam temperature entering the heat element and the tenant heat use quantity further determined based on data from at least one sensor of the second set of the plurality of temperature sensors.

4. The system of claim 1 further comprising a second set of a plurality of temperature sensors each of which includes an inlet and outlet temperature sensor the inlet temperature sensor measuring an incoming temperature of steam to the heat element, the outlet temperature sensor measuring an outgoing temperature of steam or steam condensate exiting the heat element and the tenant heat use quantity further determined based on data from at least one sensor of the second set of the plurality of temperature sensors.

5. The system of claim 4 wherein the heat use quantity is determined based on a comparison between incoming and outgoing temperatures and a quantity of steam introduced to the heat element.

6. The system of claim 1 further comprising a data storage accessible by said software and having heat element information indicative of the specifications of the plurality of heat elements stored thereon.

7. The system of claim 1 wherein the valve position is manipulated by a motor which is controlled remotely therefrom.

8. The system of claim 7 wherein the valve position is controlled by the thermostat or the computer based on readings from the temperature sensor, the temperature sensor being part of the thermostat.

9. The system of claim 1 wherein the plurality of heat elements are each located in separate tenant spaces and based upon the heat use quantity determined by the system as compared to a heat use quantity of the steam heating source a tenant charge is determined for each of the separate tenant spaces.

10. The system of claim 9 wherein the software further compares the tenant heat use quantity between multiple tenant spaces and identifies an anomaly associated with one of the at least two tenant spaces and the anomaly indicative of heat supply in an amount which varies from predicted heat supply based on the status data and wherein the tenant charge is modified based on the anomaly.

11. The system of claim 9 wherein the software further compares the tenant heat use quantity between multiple tenant spaces and identifies an anomaly associated with one of the at least two tenant spaces and the anomaly indicative of heat loss in an amount which varies from predicted heat loss based on the status data and wherein the tenant charge is modified based on the anomaly.

12. A steam heating metering system comprising:
a computer in communication with a steam heating source, a plurality of heat delivery devices and a plurality of temperature sensors, each temperature sensor associated with at least one of the plurality of heat delivery devices;
wherein the steam heating source is coupled to a plurality of heat elements via piping such that adjustment of the heat delivery devices is proportional to an amount of heat delivered when the steam heating source is activated;
each temperature sensor positioned remote from the piping such that the plurality of temperature sensors measure temperature of one or more tenant spaces in a building;
software executing on said computer and receiving data from the heat delivery devices indicative of a state thereof and status data from the steam heating source indicative of whether or not the steam heating source is activated;
data storage accessible by said software and having heat element information indicative of specifications of the plurality of heat elements stored thereon wherein the heat element information is indicative of the specifications of two or more of the plurality of heat elements in different tenant spaces;
said software determines a tenant heat use quantity for each tenant space based on the status data from the steam heating source indicating the steam heating source is activated, a set point of a thermostat associated with the tenant space and based on one or more of:
at least one of the heat delivery devices based on the status thereof,
the specifications of the associated heat element, and
readings from one of the plurality of temperature sensors associated with the heat delivery device.

13. The system of claim 12 wherein the heat delivery device includes a fan and the status is a speed.

14. The system of claim 12 wherein the heat delivery devices include a damper and the status relates to an open or closed status of the damper.

15. The system of claim 14 wherein the heat delivery device further includes a fan.

16. The system of claim 12 wherein the plurality of heat elements are each located in separate tenant spaces and based upon the heat use quantity determined by the system as compared to a heat use quantity of the steam heating source a tenant charge is determined for each of the separate tenant spaces.

17. The system of claim 16 wherein the software further compares the tenant heat use quantity between multiple tenant spaces and identifies an anomaly associated with one of the at least two tenant spaces and the anomaly indicative of heat supply in an amount which varies from predicted heat supply based on the status data and wherein the tenant charge is modified based on the anomaly.

18. The system of claim 16 wherein the software further compares the tenant heat use quantity between multiple tenant spaces and identifies an anomaly associated with one of the at least two tenant spaces and the anomaly indicative of heat loss in an amount which varies from predicted heat loss based on the status data and wherein the tenant charge is modified based on the anomaly.

19. A steam heating metering system comprising:
a computer in communication with a steam heating source and a plurality of temperature sensors;
wherein the steam heating source is coupled to a plurality of heat elements via piping at least two sets of the plurality of heat elements comprise one or more heat elements and the at least two sets are located in at least two separate tenant spaces;
each temperature sensor positioned remote from the piping such that the plurality of temperature sensors measure temperature of one of the at least two tenant spaces;
software executing on said computer and receiving status data from the steam heating source indicative of whether or not the steam heating source is activated;
data storage accessible by said software and having space information indicative of a thermal model of heat loss out of the space;
wherein when said steam heating source is activated, said software determines a tenant heat use quantity for each of the at least two tenant spaces based the status data from the steam heating source indicating the steam heating source is activated and based on the space information, a time associated with said heating source status data indicative of said steam heating source being activated and a set point of a thermostat associated with the tenant space;

the software further determining a tenant charge for the heat use quantity for each of the at least two tenant spaces based on a charge for energy usage associated with the steam heating source.

20. The system of claim 19 wherein one of the plurality of temperature sensors is part of a thermostat.

21. The system of claim 19 wherein one of the plurality of temperature sensors supplies data indicative of a steam temperature entering the heat element.

22. The system of claim 19 further comprising a second set of a plurality of temperature sensors includes an inlet and outlet temperature sensor the inlet temperature sensor measuring an incoming temperature of steam to the heat element, the outlet temperature sensor measuring an outgoing temperature of steam or steam condensate exiting the heat element and the tenant heat use quantity further determined based on data from at least one sensor of the second set of the plurality of temperature sensors.

23. The system of claim 19 wherein the heat use quantity is determined based on readings from a flow sensor associated with one of each of the at least two tenant spaces.

24. The system of claim 19 further comprising a valve associated with each of the heat elements wherein a position of the valve is manipulated by a motor based on signals from the computer, the signals determined based at least in part on a thermostat setting and a measured temperature from the thermostat.

25. The system of claim 19 wherein the data storage further includes heat element information indicative of specifications of the plurality of heat elements stored thereon, the heat element information used for determining the heat use quantity.

26. The system of claim 19 wherein the heat use quantity is determined further based on readings from at least one of the plurality of temperature sensors which measures space temperature of one of the two separate tenant spaces.

27. The system of claim 26 wherein the plurality of temperature sensors are in wireless communication with said computer.

28. The system of claim 19 wherein the data storage includes historical data thereon which is compared to actual usage by the software to determine if one or more windows in one of the tenant spaces is open.

29. The system of claim 19 wherein the software further compares the tenant heat use quantity between multiple tenant spaces and identifies an anomaly associated with one of the at least two tenant spaces and the anomaly indicative of heat supply in an amount which varies from predicted heat supply based on the status data and wherein the tenant charge is modified based on the anomaly.

30. The system of claim 19 wherein the software further compares the tenant heat use quantity between multiple tenant spaces and identifies an anomaly associated with one of the at least two tenant spaces and the anomaly indicative of heat loss in an amount which varies from predicted heat loss based on the status data and wherein the tenant charge is modified based on the anomaly.

31. A steam heating metering system comprising:
a computer in communication with a steam heating source and a plurality of temperature sensors wherein each temperature sensor is contained in one of a plurality of thermostats;

the steam heating source is coupled to a plurality of heat elements via piping and at least two sets of the plurality of heat elements comprise one or more heat elements and the at least two sets are located in at least two separate tenant spaces;

each thermostat positioned remote to the piping in that thermostat's corresponding tenant space such that the plurality of temperature sensors measure temperature of the at least two tenant spaces;

software executing on said computer and receiving status data from the steam heating source indicative of whether or not the steam heating source is activated;

said software determines a tenant heat use quantity based on the status data from the steam heating source indicating the steam heating source is activated, data indicative of a set point of each thermostat, and a size of the tenant space the software further determining a tenant charge for the heat use quantity for each of the at least two tenant spaces based on a charge for energy usage associated with the steam heating source and said software generates a bill for each tenant charge.

32. The system of claim 31 wherein the software further determines the tenant heat use quantity based on two or more of:
at least one of the heat delivery devices based on the status thereof, specifications the heat element associated with a corresponding one of the at least two tenant spaces based on a data storage accessible by said software and having heat element information indicative of the specifications of the plurality of heat elements stored thereon wherein the heat element information is indicative of the specifications of two or more of the plurality of heat elements in different tenant spaces, and readings from one of the plurality of temperature sensors associated with the heat delivery device.

* * * * *